3,382,147
COMPOSITIONS AND METHODS FOR MODIFYING AND MODULATING THE ACTIVITY OF CENTRAL NERVOUS SYSTEM DEPRESSANTS

Charles D. Proctor, Chicago, Ill. (% Meharry Medical College, Nashville, Tenn. 37208)
Filed Mar. 12, 1962, Ser. No. 179,157
9 Claims. (Cl. 167—52)

This invention is concerned with methods of modulating the action of tranquillizers and other central nervous system depressants in animals by alteration of the balance between cholinergic and adrenergic-serotonergic effects in the central nervous system in such a way as to cause ascendency of cholinergic effects which favor tranquillizer or other depressant activity, and also with systemic doses for enhancing tranquillizer or other depressant action.

It has been shown by Marrazzi (Science 118–367–370 and Annals of N.Y. Academy of Science, 66, 496–507) that cholinergic agents enhance synaptic transmission in the central nervous system of animals while adrenergic or serotonergic agents inhibit synaptic transmission.

It is an object of this invention to provide methods of modifying the action of tranquillizers and other central nervous system depressants in animals.

It is the further object of this invention to provide systemic doses for enhancing the central nervous system action of tranquillizers and other central nervous system depressants in animal.

Figure 1:
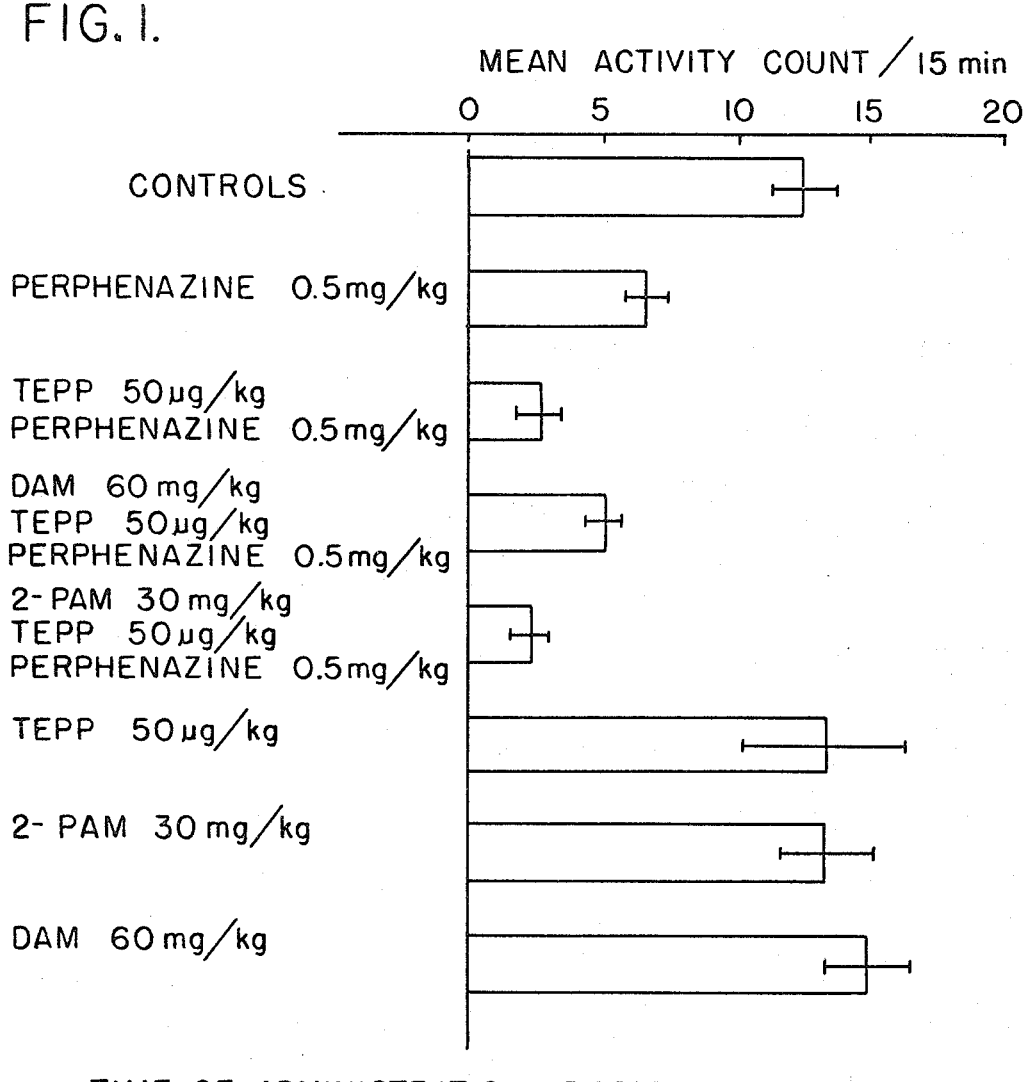

In FIG. 1 the ability of a central nervous system active anticholinesterase to enhance the activity of a phenothiazine tranquillizer is shown. It is evident from the data in FIG. 1 that the ability of perphenazine 2-chloro-10-{3-[1-(2-hydroxyethyl) - 4 - piperazinyl]propyl}-phenothiazine to depress locomotor activity in the mouse has been extended by the administration of appropriate dosage of the central nervous system active anticholinesterase agent tetraethylpyrophosphate (TEPP). It should be noted that the dose of TEPP utilized to enhance the effect of the tranquillizer is not in itself measurably depressant. FIGURE 1 further shows that diacetylmonoxime (DAM), a weak cholinesterase reactivator which has both central nervous system and peripheral activity, reduces TEPP extension of perphenazine activity while pyridine-2-aldoxime methiodide (2-PAM), a more potent cholinesterase reactivator, but with activity in the mouse confined to areas outside the brain, fails to reverse this extension.

From these findings, it would appear that the central nervous system action of the TEPP, an action known to enhance cholinergic activity, results in an unexpected potentiation of the tranquillizer or other depressant activity of the perphenazine.

While perphenazine has been cited as the specific tranquillizer in the illustration cited above, other agents of this class such as chlorpromazine (2-chloro-10-(3-dimethylaminopropyl)-phenothiazine), promazine (10-(3-dimethylaminopropyl)phenothiazine), thiopropazate (2-chloro-10-{3-[1-(2 - acetoxyethyl) - 4 - piperazinyl]propyl} phenothiazine) and trifluoperazine (2-trifluoromethyl-10-[3'-(1 - methyl-4-piperazinyl)propyl]phenothiazine) may be substituted with comparable results.

Figure 2:
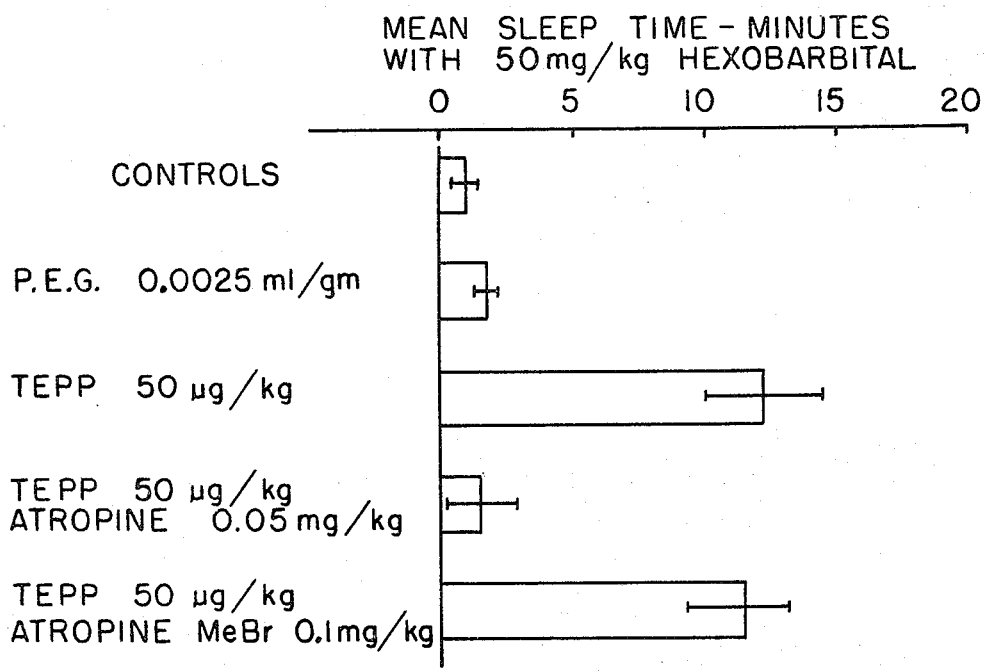

In FIGURE 2 the results shown illustrate that the TEPP enhancement of barbiturate hypnotic activity is reversed by the action of the central nervous system active anticholinergic agent, atropine sulfate (dl-hyoscyamine sulfate), but not by the central nervous system inactive anticholinergic, atropine methyl bromide (dl-hyoscyamine methyl bromide). This fact, along with the fact that octamethyl pyrophosphoramide (OMPA) will not substitute for the TEPP in producing enhancement of hexobarbital (sodium 5-(1-cyclohexen-1-yl)-1,5-dimethylbarbiturate) hypnotic effect, clearly demonstrates the necessity for use of the cholinergic effects of a centrally active anticholinesterase in the production of this extension of barbiturite activity.

It is of further interest to note that the central nervous system active anticholinesterase agent, parathion (O,O-diethyl O-p-nitrophenyl thiophosphate) can be substituted for the TEPP in experiments of this same experimental design to yield results analogous to those obtained with TEPP.

Figure 3:
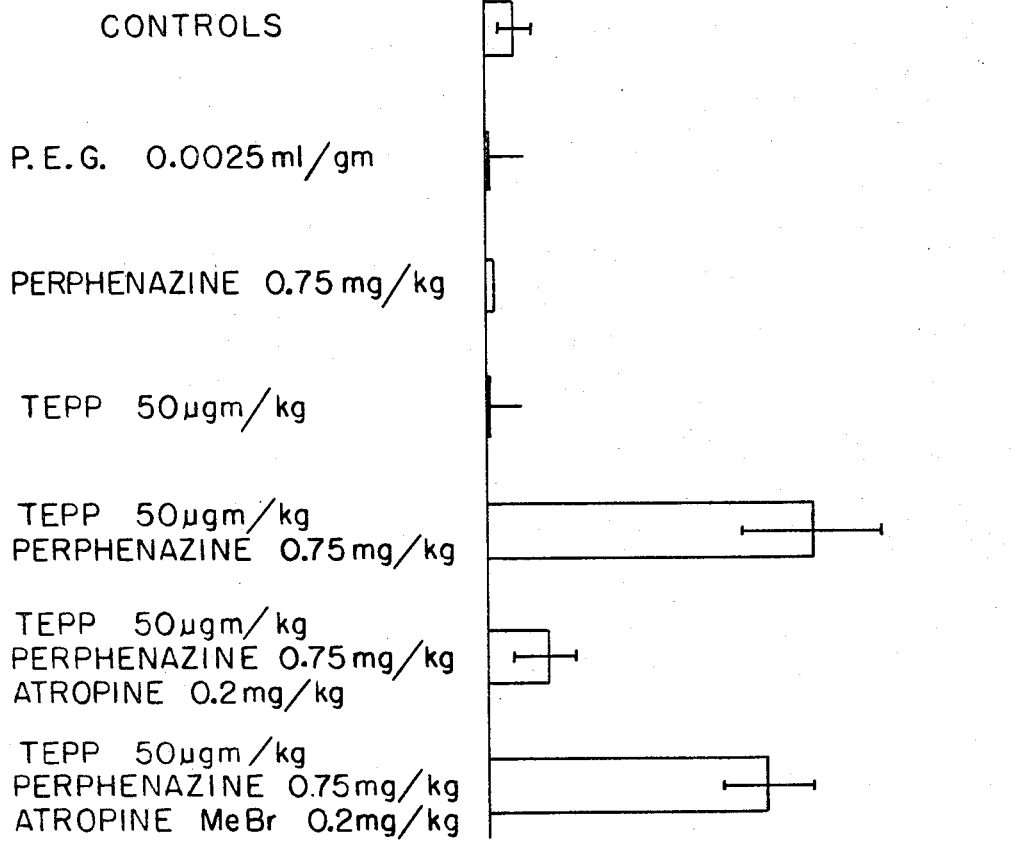
Figure 4:
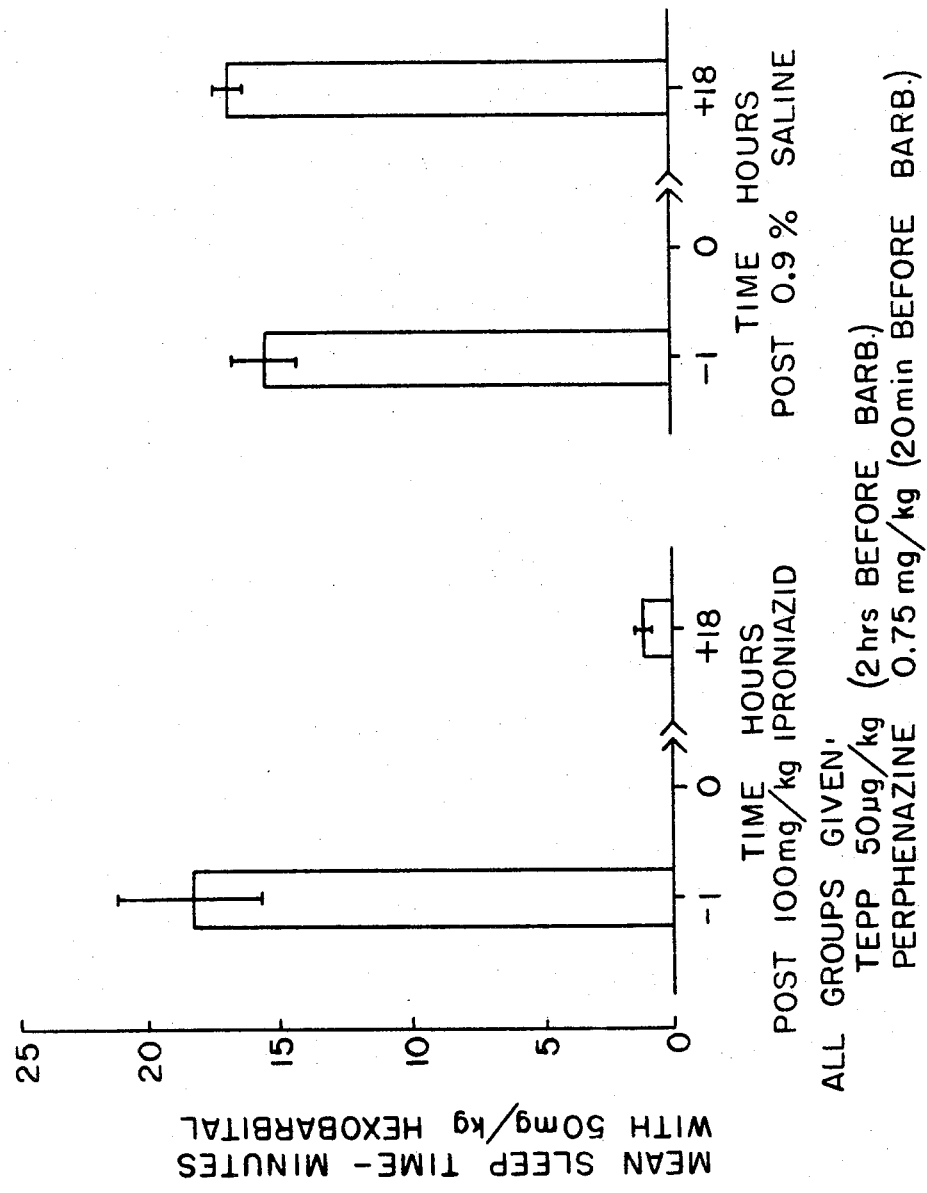

From the findings presented in FIG. 3, it is apparent that when the sub-threshold hexobarbital dose-effect is concomitantly subjected to a dose of perphenazine which failed to produce barbiturate anesthetic threshold as defined below and a dose of TEPP which in itself also failed (due to inadequacy of the 2 hr. latent period, see Table 1), significant anesthesia results. This anesthesia was reversed by atropine sulfate (0.2 mgm./kgm.) but not by atropine methyl bromide (0.2 mgm./kgm.), and could not be reproduced when 0.5 mgm./kgm. of OMPA was substituted for TEPP in the experiment. This cross-potentiation between TEPP and perphenazine was also reversed by 18 hour prior administration of 100 mgm./kgm. iproniazid (isonicotinic acid 2-isopropylhydrazide) (FIG. 4). Reversal by the monoamine oxidase inhibitor occurred whether the same group of animals served as its own pre-iproniazid controls (FIG. 4) or if different groups of mice were used for the pre- and post-iproniazid determination of combined TEPP-perphenazine-hexobarbital sleep time. Substitution of another long acting monoamine oxidase inhibitor, Catron (1-phenyl-2-hydrazinopropane), 5 mgm./kgm., for the iproniazid in both types of experiment gave results similar to those obtained with iproniazid.

While the barbiturate cited in the above discussion is hexobarbital other hypnotic derivatives of this class such as barbital (sodium 5,5-diethylbarbiturate), secobarbital (sodium 5-allyl - 5 - (1 - methylbutyl)barbiturate), amobarbital (sodium 5 - ethyl - 5 - isoamylbarbiturate), phenobarbital (sodium 5-ethyl-5-phenylbarbiturate), diallylbarbituric acid (5,5-diallylbarbituric acid), thiopental (sodium 5-ethyl-5-(1-methylbutyl)-2-thiobarbiturate) and pentobarbital (sodium 5-ethyl - 5 - (1-methylbutyl)-barbiturate) may be substituted for the hexobarbital with comparable results.

While the central nervous system active antichlolinesterases cited in the above discussion have included TEPP and parathion, other central nervous system active anticholinesterases such as di-isopropylfluorylphosphonate and physostigmine may be substituted for the TEPP and the parathion with comparable results.

In Table 1 it is shown that appropriate dosage of TEPP is capable of converting a sub-threshold hypnotic dose of a barbiturate, hexobarbital, to threshold hypnotic activity. The table also shows that this property of the TEPP is manifest irrespective of whether water or polyethylene glycol is used as a solvent for the TEPP.

TABLE I

| Hours after injection | Mean sleep time in minutes with— | | |
|---|---|---|---|
| | 50 mg./kg. hexobarbital alone | Hexobarbital, 50 mg./kg. plus TEPP 50 mcg./kg. | |
| | | In water | In polyethylene glycol |
| 0 | Less than 1 | 0 | 0 |
| 0.5 | do | 9.0 | 0 |
| 1.0 | do | (*) | 0.5 |
| 1.5 | do | (*) | 0.5 |
| 2.0 | do | 12 | 2.0 |
| 2.5 | do | (*) | 13.0 |

*No observation made.

It is evident from Table I that when the TEPP is administered in water, effects are manifest in a period of ½ hour and after 2 hours the effect is still present. When TEPP is administered in polyethylene glycol, however, the effects are delayed with significant activity occurring only after a 2½ hour period.

The studies were carried out in adult albino mice weighing 20–30 gm. Drugs employed, grouped by pharmacologic classification, are as follows:

(A) Anticholinesterases (antiCHases) in polyethylene glycol (1) tetraethylpyrophosphate (TEPP) injected within 10 minutes)
(2) parathion
(3) octamethyl pyrophosphoramide (OMPA)

(B) Anticholinergics (1) atropine sulfate
(2) atropine methyl bromide
(3) N-ethyl - 3 - piperidyl benzilate hydrochloride (JB–318)
(4) N-ethyl-3-piperidyl benzilate methyl bromide (JB–323)

(C) Cholinesterase reactivators (1) pyridine-2-aldoxime methiodide (2–PAM)
(2) diacetylmonoxime (DAM)

(D) Monoamine oxidase inhibitors (1) ipromiazid
(2) beta-phenylisopropyl hydrazine (Catron)

(E) Tranquillizer (1) perphenazine (F) Barbiturate (1) hexobarbital

The antiCHases used had a purity of 98% or better. All drug administration was by the intraperitoneal route and all drugs used except the antiCHases were dissolved in distilled water. Unless otherwise indicated aqueous solutions of drugs were administered in a volume of 0.01 ml./gm. weight. In most instances the antiCHases were dissolved in polyethylene glycol (P.E.G.) (Carbide and Carbon Co. "Carbowax-200") and injected in a volume of 0.0025 ml./gm. Because TEPP is unstable in water solution, TEPP in aqueous solution was made up and injected within 10 minutes for each group of 10 animals the few times this solution was used. All drug solutions were prepared freshly on the day of use. In a given experiment, each animal, treated or control, received the same number and volume of injections on a similar time schedule using physiological saline as a "sham" injection where necessary. A separate group of P.E.G. controls, with the glycol injection analogously to the antiCHases in P.E.G. solution, was also included in each experiment.

In the investigation of the alteration of subthreshold hexobarbital dosage effect, time was measured from the loss of righting reflex following 50 mgm./kgm. of hexobarbital to a spontaneous return of the reflex. End point of the determination was fixed at maintenance of the righting reflex when tested three times within 30 seconds following spontaneous righting. Experiments performed to determine effects on mouse locomotor activity were carried out in activity cages (motometers) according to the procedure of Bastian and Hill J. Pharmacol. and Exptal. Therap. 119, 132 (1957) activity being measured for a 15 minute period immediately after placing the animals in the activity cages.

While the agents specifically cited and enumerated in all of the specification and claims presented heretofore and hereafter are cited by way of example and illustration, they are not to be constructed as limiting the invention since it is obvious that other agents from the respective pharmacologic classes of agents typical of these agents which have been specifically cited could be employed to yield comparable effects.

I claim:

1. A composition for modifying the central nervous system activity of an animal consisting essentially of an effective amount of an anticholinesterase selected from the group consisting of tetraethyl pyrophosphate, O,O-diethyl-O-p-nitrophenyl thiophosphate, and diisopropyl fluorophosphate, a central nervous system depressant selected from the group consisting of phenothiazine tranquillizers and a hypnotic derivative of barbituric acid, and a pharmaceutically acceptable carrier.

2. A composition according to claim 1 wherein said central nervous system depressant is a hypnotic derivative of barbituric acid.

3. A composition for modifying the central nervous system activity of an animal consisting essentially of an effective amount of an anticholinesterase selected from the group consisting of tetraethyl pyrophosphate, O,O-diethyl-O-p-nitrophenyl thiophosphate, and diisopropyl fluorophosphate, a phenothiazine tranquillizer, and a pharmaceutically acceptable carrier.

4. The composition of claim 3 wherein the phenothiazine tranquillizer is 2-chloro-10-{3-[1-(2-hydroxyethyl)-4-piperazinyl]propyl}-phenothiazine.

5. The composition of claim 3 wherein the anticholinesterase is tetraethylpyrophosphate.

6. The composition of claim 3 wherein the anticholinesterase is (O,O - diethyl O - p - nitrophenyl thiophosphate).

7. The composition of claim 2 wherein the derivative of barbituric acid is (sodium 5-(1-cyclohexen-1-yl)-1,5-dimethylbarbiturate).

8. The method of enchancing the central nervous system hypnotic effect of a hypnotic barbiturate which comprises concurrently administering intraperitoneally to an animal a composition consisting essentially of an effective amount of a central nervous system active anticholinesterase selected from the group consisting of tetraethyl pyrophosphate O,O-diethyl-O-p-nitrophenyl thiophosphate and diisopropyl fluorophosphate and a pharmaceutically acceptable carrier.

9. The method of enchancing the central nervous system tranquillizing effect of a phenothiazine tranquillizer which comprises concurrently administering intraperitoneally to an animal a composition consisting essentially of an effective amount of a central nervous system active anticholinesterase selected from the group consisting of tetraethyl pyrophosphate, O,O-diethyl-O-p-nitrophenyl thiophosphate and diisopropyl fluorophosphate and a pharmaceutically acceptable carrier.

References Cited

Beckman: Pharmacology, Saunders Co., 1961, pp. 406–408.

Burger: Medicinal Chemistry, second ed., Interscience Publishers Inc., 1960, pp. 434, 429.

Carpenter: Carbide and Carbon Chemical Co., U.C.C., New York, 17, N.Y., F. 8932, p. 13.

Merck Index, 7th ed., Merck Co., 1960, pp. 773, 814 and 1022–1023.

ALBERT T. MEYERS, *Primary Examiner.*

MORRIS O. WOLK, FRANK CACCIAPAGLIA, JR., LEWIS GOTTS, JULIAN S. LEVITT, *Examiners.*

S. FRIEDMAN, P. SABATINE, M. J. COHEN,
*Assistant Examiners.*